United States Patent [19]
Peterson et al.

[11] Patent Number: 5,992,507
[45] Date of Patent: Nov. 30, 1999

[54] GEOTHERMAL COMMUNITY LOOP FIELD

[75] Inventors: Barry A. Peterson, San Francisco, Calif.; Armand H. Peterson, Cave City, Ky.

[73] Assignee: Phillips Petroleum Company, Bartlesville, Okla.

[21] Appl. No.: 09/044,888

[22] Filed: Mar. 20, 1998

[51] Int. Cl.$^6$ ...................................................... F24D 10/00
[52] U.S. Cl. .............................. 165/45; 165/71; 165/103; 237/13
[58] Field of Search .......................... 165/45, 71, 104.32, 165/103; 62/260; 237/8 R, 8 A, 13

[56] References Cited

U.S. PATENT DOCUMENTS

| | | | |
|---|---|---|---|
| 3,838,813 | 10/1974 | Brosenius .................................... | 237/13 |
| 3,924,882 | 12/1975 | Ellis ............................................ | 285/175 |
| 4,215,551 | 8/1980 | Jones ........................................... | 60/643 |
| 4,512,156 | 4/1985 | Nagase ........................................ | 60/641.2 |
| 4,873,840 | 10/1989 | Gilliusson .................................... | 62/236.6 |
| 4,909,312 | 3/1990 | Biedenbach et al. ....................... | 165/45 |
| 4,911,229 | 3/1990 | McElroy ..................................... | 165/45 |
| 4,912,941 | 4/1990 | Buchi .......................................... | 62/260 |
| 4,920,757 | 5/1990 | Gazes et al. ................................ | 62/181 |
| 5,062,736 | 11/1991 | Katsuragi et al. .......................... | 404/72 |
| 5,244,037 | 9/1993 | Warnke ....................................... | 165/104.31 |
| 5,533,356 | 7/1996 | DeMasters .................................. | 62/260 |
| 5,573,183 | 11/1996 | Leskinen ..................................... | 237/8 R |

OTHER PUBLICATIONS

Lipták, B.G., "Instrument Engineers' Handbook",1985, pp. 531–533.

*Primary Examiner*—Allen Flanigan
*Attorney, Agent, or Firm*—Ryan N. Cross

[57] ABSTRACT

A geothermal community loop field which serves as a shared means of heat exchange for a plurality of thermal loads. Heat is exchanged between the ground and a circulating heat exchange fluid in at least one subterranean heat exchanger. Heat is exchanged between each thermal load and the circulating heat exchange fluid by contacting the external heat exchanger of each thermal load with the circulating heat exchange fluid. Flow of the circulating heat exchange fluid between the geothermal community loop field and each thermal load is controlled by a plurality of flow control centers, each servicing one thermal load. The flow control centers provide means for installing additional thermal loads or maintaining existing loads without affecting the operation of the rest of the system. In addition, the flow control centers provide a means for setting the flow rate of heat exchange fluid to each thermal load.

7 Claims, 7 Drawing Sheets

GEOTHERMAL COMMUNITY LOOP FIELD

BACKGROUND OF THE INVENTION

This invention relates to the field of geothermal heating and cooling systems, and more specifically to a geothermal community loop field which serves as a shared means of heat exchange for a plurality of heating and/or cooling loads.

Numerous types of heating and cooling systems are used today as means for controlling the temperature of various thermal loads. Many existing heating and cooling systems, such as heat pumps, air conditioners, and refrigeration units operate on the same thermodynamic principles and utilize the same basic components. Most commonly these basic components include a compressor, an expander, a load heat exchanger, and an external heat exchanger each connected with a piping system which carries a circulating refrigerant throughout the system. This type of heating or cooling system, in order to operate, generally requires a step for heat exchange with the environment. This heat exchange with the environment is typically accomplished by directing the circulating refrigerant to an outdoor coil (i.e., the external heat exchanger) where thermal energy is exchanged between the refrigerant contained in the coils and the outside air.

A significant problem associated with using outside air as the sink or source for a heat exchange process is its inconsistent temperature. For example, a heating system, such as a heat pump operating during the winter, requires the external heat exchanger to absorb thermal energy from the outside air. However, the heating system loses its efficacy and efficiency as the outside temperature falls because less thermal energy can be extracted from the outside air. This problem is compounded due to the fact that as the temperature drops, additional thermal energy is required to heat the load. Similarly, a cooling system, such as an air conditioner, encounters the same efficacy and efficiency problems when the outside temperature rises.

It has previously been recognized that geothermal heat exchange is potentially a more efficient and effective way to perform the external heat exchange required by many heating and cooling systems. Unlike air temperatures, the ground temperature is a relatively constant 65 to 72 degrees F. at a depth below the frost line. Additionally, the ground can act as a virtually limitless energy source or sink.

Geothermal heating and cooling systems are generally comprised of the same essential components as other heating and cooling systems; however, the external heat exchanger operates in a different manner. The external heat exchange process of a geothermal heating or cooling system is generally accomplished by one of two methods. The first method is to simply extend the refrigerant carrying coil into the soil, thereby directly exchanging heat with the ground. The second method utilizes a circulating heat exchange fluid (typically water or an aqueous solution) to carry thermal energy between the ground and the thermal load. Typically, this circulating heat exchange fluid travels in a piping system between a subterranean heat exchanger, where heat is exchanged with the ground, and the thermal load, where heat is exchanged with the heating or cooling system. When the refrigerant carrying coil of the heating or cooling system contacts this circulating heat exchange fluid, heat is exchanged directly with the circulating heat exchange fluid and, thereby, indirectly with the ground.

Most existing large scale residential, commercial, and industrial geothermal heating and cooling systems use a circulating heat exchange fluid to transfer heat between the system and the ground. Heretofore, geothermal systems of this type typically employ a single, dedicated loop field to service each individual thermal load. However, the high initial cost of installing a dedicated loop field for each individual thermal load takes away from the savings provided by more efficient heat exchange. This high initial cost frequently results in a cost recovery period which is longer than what is determined to be economically feasible. Also, when a heating load operates near a cooling load, it is very inefficient for the heating and cooling loads to utilize separate dedicated geothermal loop fields rather than sharing in energy transfer through a single geothermal community loop field.

In the past, a few large scale systems have utilized a shared geothermal community loop field to carry the circulating heat exchange fluid to a plurality of individual thermal loads. However, past systems required that the entire geothermal community loop field be shut down in order to add a new individual thermal load, and after the new unit was added, past systems required the entire loop system to be purged of air before operation could resume. In addition, geothermal community loop fields have not gained widespread use because the high initial cost has been difficult for the loop owner to recover.

SUMMARY OF THE INVENTION

It is, therefore, an object of the present invention to provide a superior geothermal community loop field which serves as a shared means of heat exchange for a plurality of heating and/or cooling loads and allows for individual thermal loads to be easily installed and maintained.

It is further an object of the present invention to provide a more economically feasible geothermal community loop field which provides an effective means for recovering the initial cost of the system.

In accordance with this invention, there is provided a geothermal community loop field system comprising: at least one subterranean heat exchanger contacting the ground below the frost line, and wherein thermal energy is exchanged between a circulating heat exchange fluid and the ground; a plurality of flow control centers connecting the geothermal community loop field in fluid flow communication with the thermal loads, and through which the flow of the heat exchange fluid between the geothermal community loop field and each thermal load may be controlled; and a manhole containing purging valves, hereinafter referred to as a purging manhole. The purging valves are connected in fluid flow communication with the community loop field, and through which the circulating heat exchange fluid may be introduced into or extracted from the geothermal community loop field.

By serving as a shared means of heat exchange for a plurality of thermal loads, the geothermal community loop field of the present invention allows for heating and cooling loads operating in opposite capacities to share in energy transfer through a single system of circulating heat exchange fluid, thus making the operation of the total system more efficient. In addition, the flow control centers of the present invention allow for thermal loads to be easily installed and maintained, while providing a means for the system owner to recover the initial investment by charging regular fees based on usage.

DETAILED DESCRIPTION OF THE INVENTION

Figure 1A:
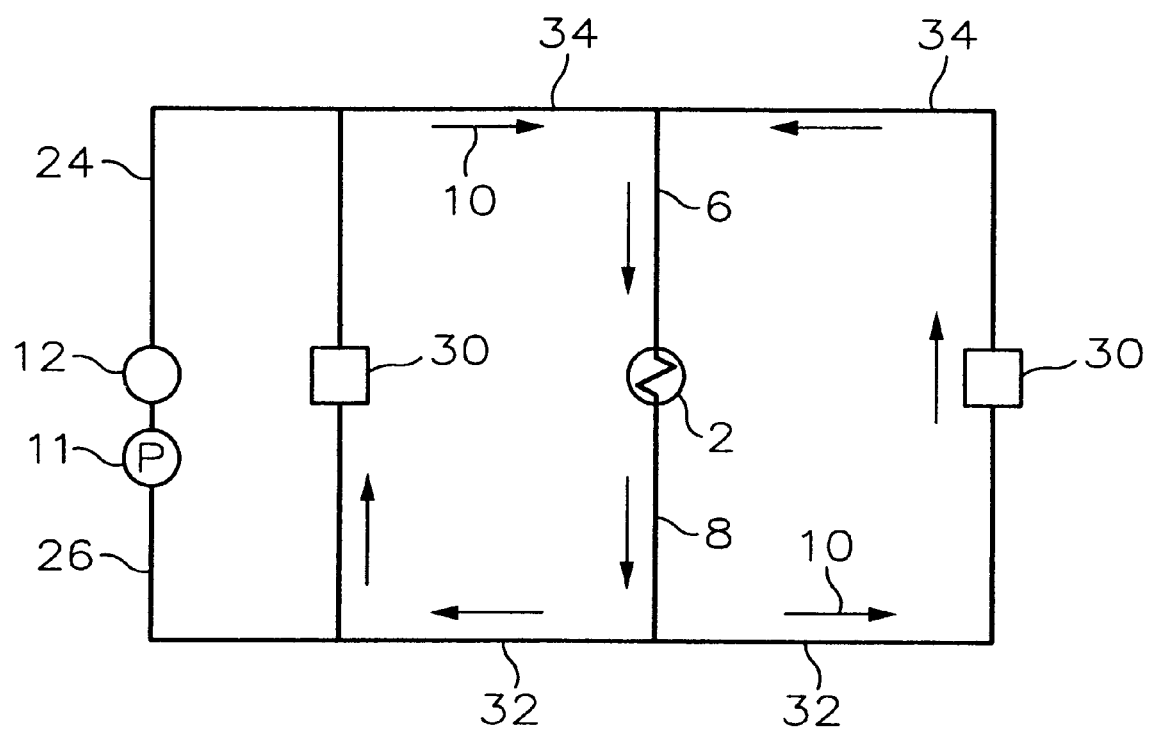
FIGS. 1a and 1b are plain views of the geothermal community loop fields according to the invention.
Figure 1B:
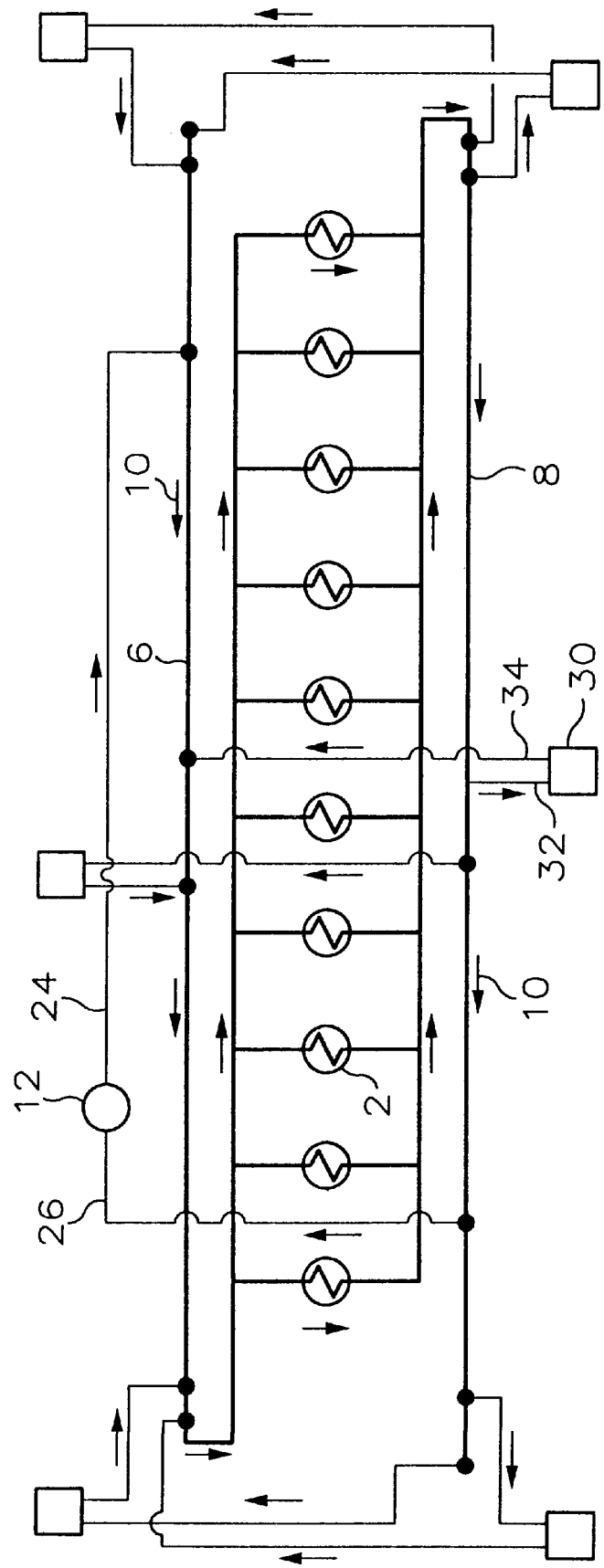
Figure 2:
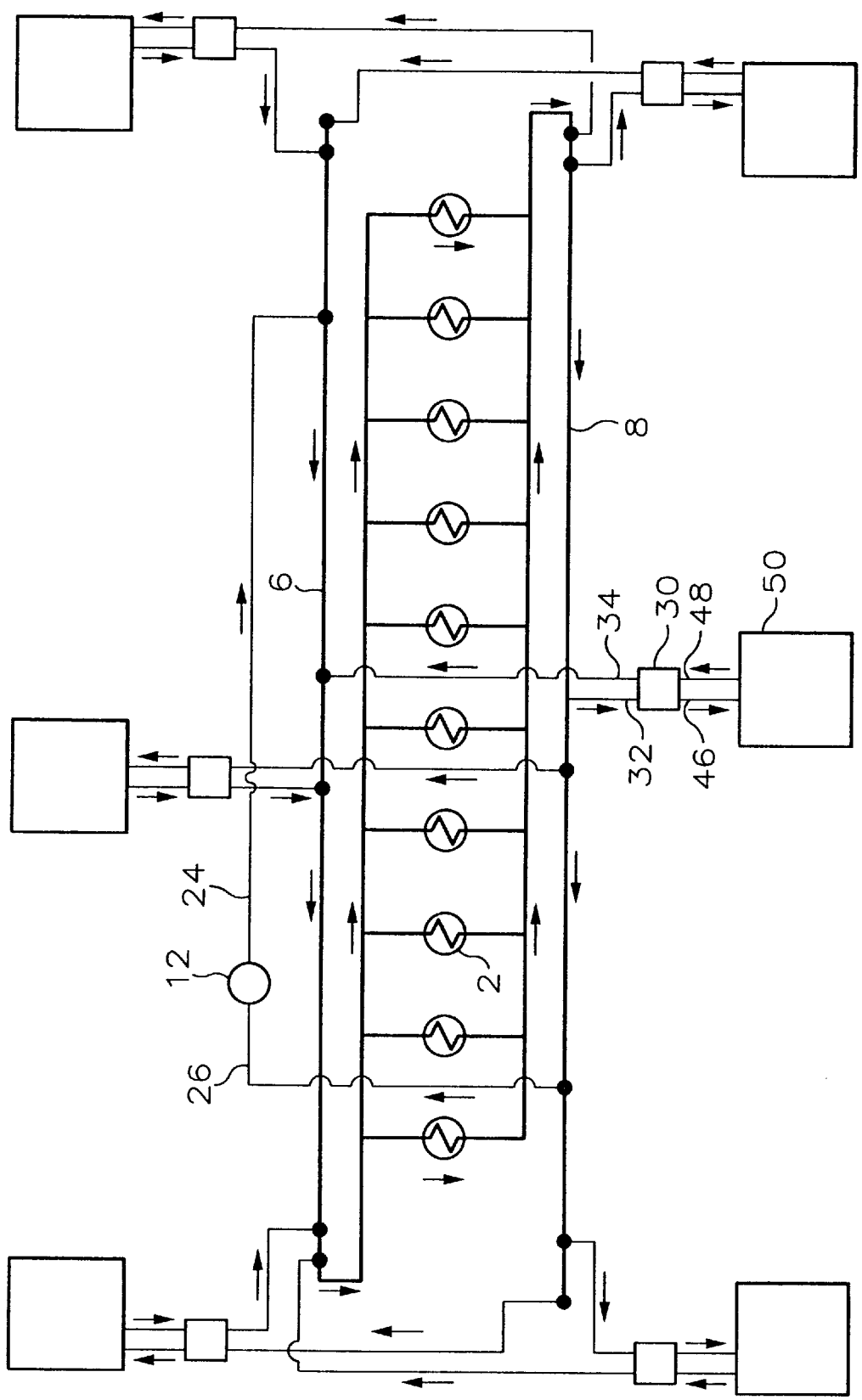
FIG. 2 is a plain view of the geothermal community loop field in relation to the thermal loads which it services.

FIGS. 1a and 1b each illustrate an embodiment of the geothermal community loop field of the present invention. FIG. 2 shows the embodiment of FIG. 1b in relation to the individual thermal loads, such as individual thermal load 50, which it services. An individual thermal load may be any temperature controlled structure or device requiring heat exchange with an outside environment, and is typically a house, building, refrigeration unit, or heating unit.

Figure 3:
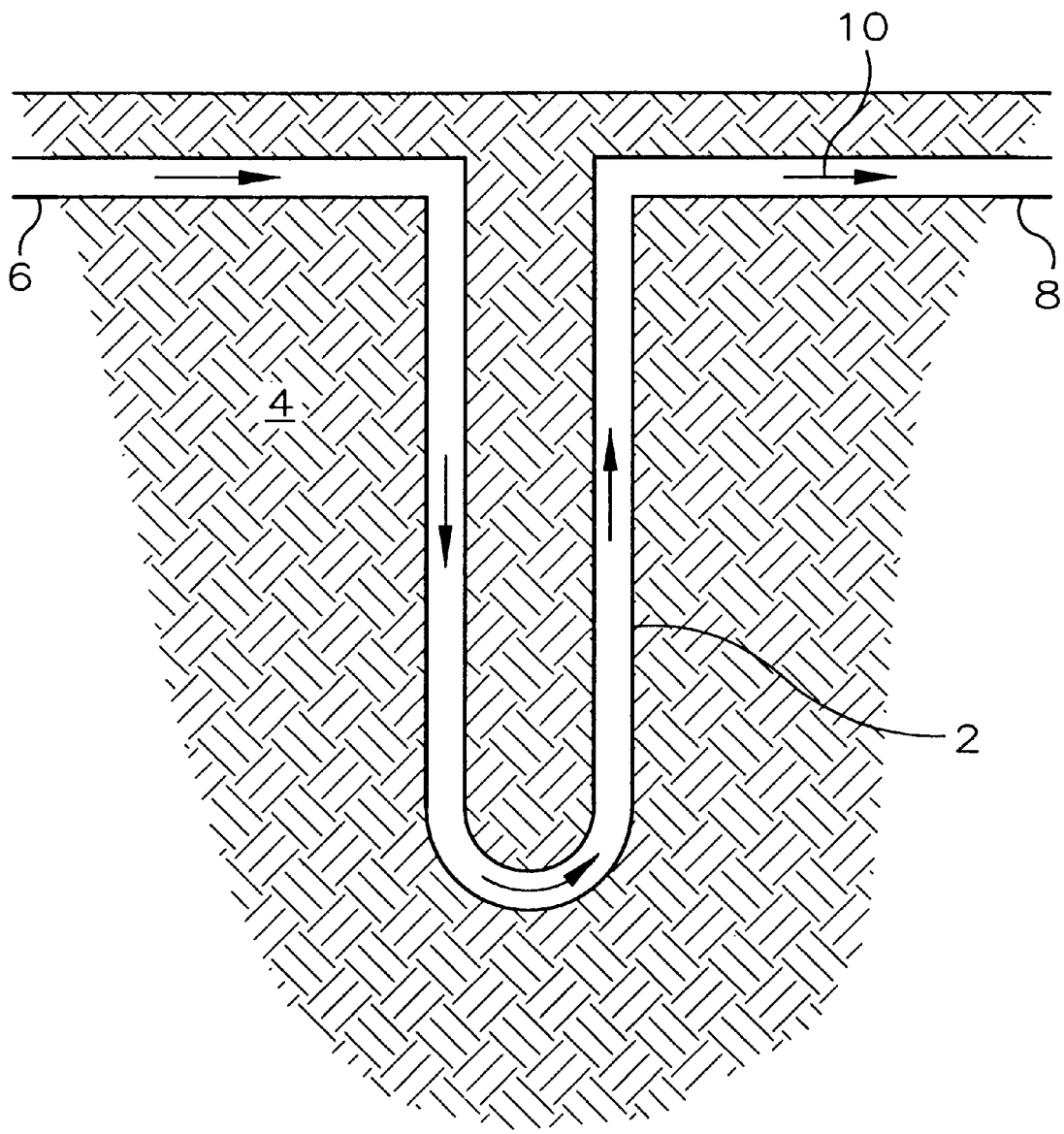
FIG. 3 is a sectional view of the subterranean heat exchange coil.

The present invention requires at least one subterranean heat exchanger, such as subterranean heat exchanger 2, as a means for exchanging thermal energy with the ground. A plurality of subterranean heat exchangers may be necessary to effectively service numerous and/or large individual thermal loads. As illustrated in FIG. 3, subterranean heat exchanger 2 generally comprises an arrangement of conduits or pipes contacting a ground sink/source 4 and through which a circulating heat exchange fluid 10 may flow. Ground sink/source 4 is typically the naturally occurring subsurface soil, groundwater, or other material, but may be any fill material or mixture placed by man. Circulating heat exchange fluid may be any fluid suitable for absorbing, dissipating, and carrying thermal energy, and is preferably water or an aqueous solution.

Subterranean heat exchanger 2 contacts ground sink/source 4 in a manner which allows for a sufficient amount of heat to be exchanged between circulating heat exchange fluid 10 and ground sink/source 4. Subterranean heat exchanger 2 may contact ground sink/source 4 in a vertical, slanted, and/or horizontal arrangement. Preferably, subterranean heat exchanger 2 extends into ground sink/source 4 in a vertical arrangement to minimize space requirements. Most preferably, subterranean heat exchanger 2 is a vertically elongated U-shaped arrangement of plastic pipe with an inside diameter between 1 inch and 12 inches, positioned perpendicular to the surface of ground sink/source 4, extending vertically into ground sink/source 4, and oriented with the closed end of the "U" in a downward position.

The quantity and size of subterranean heat exchangers may vary depending upon load requirements, including the number, size, and operating parameters of individual thermal loads. The quantity and size of subterranean heat exchangers may also depend on external variables such as the amount of space available for excavation and the condition of the subsurface soil. If there is little space available for excavation and/or the deep subsurface soil is easily excavated, it may be more feasible to install fewer and larger (deeper) subterranean heat exchangers. If there is abundant space available for excavation and/or the deep subsurface soil is difficult to excavate, it may be more feasible to install more and smaller (shallower) subterranean heat exchangers.

Returning now to FIGS. 1a and 1b and FIG. 2, subterranean heat exchanger 2 is connected in fluid flow communication to a return header piping system 6 and a supply header piping system 8. Circulating heat exchange fluid 10, shown by the arrows, flows from return header piping system 6, through subterranean heat exchanger 2, and into supply header piping system 8. The pipe used for return header conduit or piping system 6 and supply header piping system 8 may be of any size capable of carrying the desired quantity of circulating heat exchange fluid 10. In addition, the pipe may be of any composition capable of being installed underground and carrying circulating heat exchange fluid 10 without becoming corroded.

Figure 4:
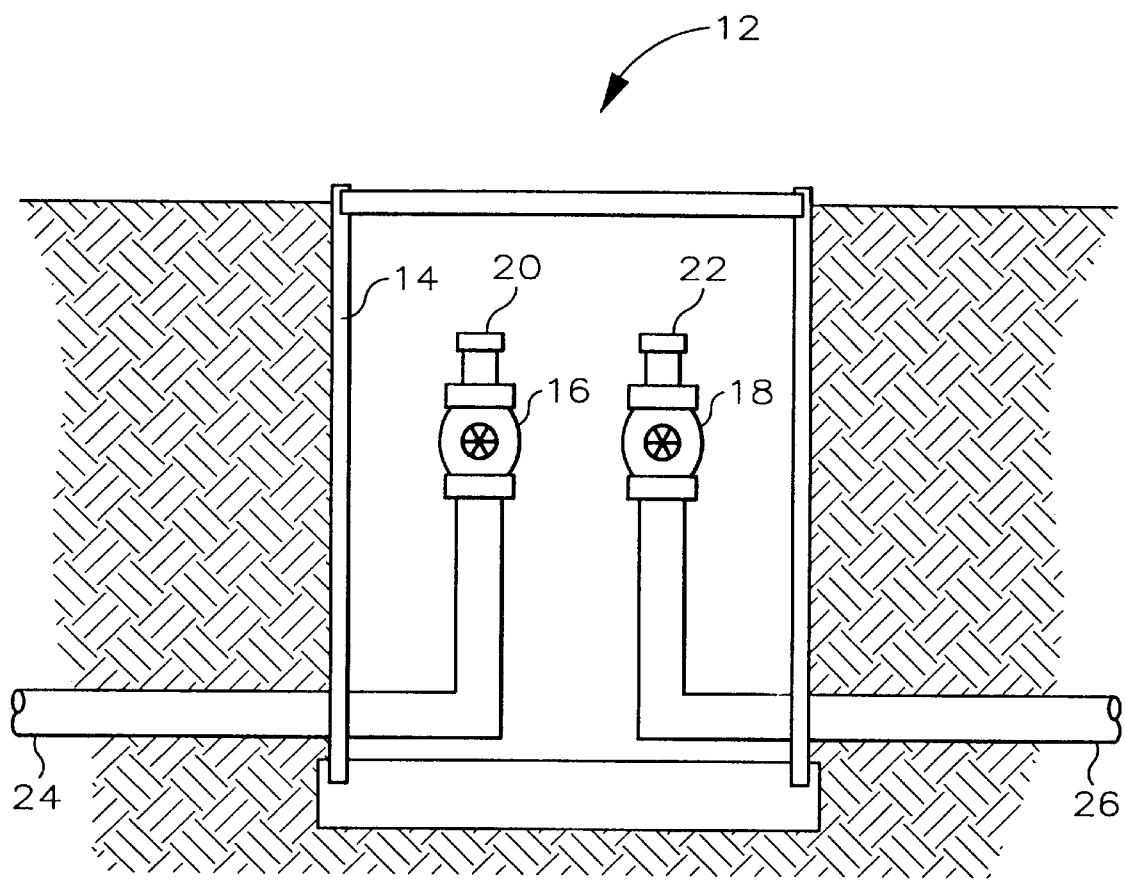
FIG. 4 is a sectional view of the purging manhole.

When a plurality of subterranean heat exchangers are employed, as shown in FIG. 1b and FIG. 2, return header piping system 6 and supply header piping system 8 may be configured in a manner which forces circulating heat exchange fluid 10 to flow through all subterranean heat exchangers in a parallel manner with each parallel branch of approximately equal flow length, thus preventing circulating heat exchange fluid 10 from simply passing through a single subterranean heat exchanger. This allows for circulating heat exchange fluid 10 to flow through each subterranean heat exchanger at a substantially equal flow rate, thereby permitting the heat exchange between ground sink/source 4 and circulating heat exchange fluid 10 to occur at optimum system efficiency. As seen in FIGS. 1a, 1b and 2, a purging manhole 12 is connected with return header piping system 6 and supply header piping system 8. Purging manhole 12 is connected in fluid flow communication to return header piping system 6 by a manhole/return header conduit or pipe 24 and is connected in fluid flow communication to supply header piping system 8 by a manhole/supply header conduit or pipe 26. Purging manhole 12 can be any means for introducing and extracting circulating heat exchange fluid 10 to and from the geothermal community loop field. As illustrated in FIG. 4, purging manhole 12 may comprise a manhole housing 14 encasing an entering gate valve 16, an exiting gate valve 18, an entering flange cap 20, and an exiting flange cap 22.

Manhole housing 14 may be any means of encasement capable of protecting the enclosed components from the environment and having a means for accessing the enclosed components when it is necessary to introduce or extract the heat exchange fluid. Manhole housing 14 comprises walls, a floor, and a lid. The floor and walls of manhole housing 14 are typically located under ground, while the lid may be at a level about even with the ground surface. The walls may be circular, rectangular, or any suitable shape, and should be securely fastened to the floor in a water tight manner. Either the floor or the walls should have a means through which manhole/return header pipe 24 and manhole/supply header pipe 26 may enter manhole housing 14. The lid should be attached to the walls in a manner which allows for easy access into manhole housing 14 and protects its contents from substantially all outside moisture and debris.

As illustrated in FIG. 4, the contents of manhole housing 14 comprises a manhole/return header pipe 24 connected in fluid flow communication with entering gate valve 16 which connects in fluid flow communication with entering flange cap 20, and manhole/supply header pipe 26 connected in fluid flow communication with exiting gate valve 18 which connects in fluid flow communication with exiting flange cap 22. Entering flange cap 20 and exiting flange cap 22 provide a means for attachment of an external pump or drain hose. Entering gate valve 16 and exiting gate valve 18 provide a means for preventing circulating heat exchange fluid 10 from escaping the geothermal community loop field while purging manhole 12 is not in use.

Circulating heat exchange fluid 10 is introduced into the system by connecting an external pump to entering flange cap 20, connecting a drain hose to exiting flange cap 22, opening entering gate valve 16 and exiting gate valve 18, and pumping circulating heat exchange fluid 10 into the system through manhole/return header pipe 24 until substantially all air is purged from the system. Circulating heat exchange fluid 10 may be extracted from the system by connecting an external pump to exiting flange cap 22, opening entering gate valve 16 and exiting gate valve 18, and pumping circulating heat exchange fluid 10 out of the system through manhole/supply header pipe 26 until substantially all circulating heat exchange fluid 10 is removed.

In an alternate embodiment, an external circulating pump may be connected in fluid flow communication to entering flange cap 20 and exiting flange cap 22 and may operate as a supplemental means of pumping circulating heat exchange fluid 10 throughout the geothermal community loop field. Circulating heat exchange fluid 10 is typically forced through the geothermal community loop field by circulating pumps located in the individual thermal loads; however, if a large geothermal community loop field, designed to service a multitude of individual thermal loads, is currently servicing only a few individual thermal loads, use of a supplemental pump at purging manhole 12 may be required to provide sufficient force to circulate the heat exchange fluid at an effective rate for cooling and heating.

As shown in FIG. 2, the present invention utilizes a plurality of flow control centers, such as a flow control center 30, as means for attaching individual thermal loads, such as individual thermal load 50, to the geothermal community loop field. Each individual thermal load has a dedicated flow control center which regulates the flow of the heat exchange fluid to and from that individual thermal load. Numerous flow control centers may be originally installed with geothermal community loop fields in order to allow for future expansion by simply connecting new individual thermal loads to unused flow control centers. As seen in FIG. 2, flow control center 30 is connected in fluid flow communication to return header piping system 6 by a loop return conduit or pipe 34, and is connected in fluid flow communication to supply header piping system 8 by a loop supply conduit or pipe 32. Individual thermal load 50 is connected in fluid flow communication to flow control center 30 by a load supply conduit or pipe 46 and a load return conduit or pipe 48.

FIGS. 5a–5d more clearly illustrate the components of flow control center 30. Flow control center 30 comprises a flow control center housing 36 encasing an entering three-way valve 38, an exiting three-way valve 40, a flow setting valve 42, and a check valve 44. Flow control center housing 36 may be any means of encasement capable of protecting the enclosed valves from the outside environment and having a means for accessing the enclosed valves when flow adjustment is necessary. Flow control center housing 36 may comprise walls, a floor, and a lid. The floor and walls of flow control center housing 36 are typically located under ground, while the lid may be at a level about even with the ground surface. The walls may be circular, rectangular, or any suitable shape, and should be securely fastened to the floor in a water tight manner. Either the floor or the walls should have a means through which loop supply pipe 32, loop return pipe 34, load supply pipe 46, and load return pipe 48 may enter flow control center housing 36. The lid should be attached to the walls in a manner which allows for easy access to flow control center housing 36, and protects its contents from substantially all outside moisture and debris.

FIGS. 5a–5d show that, inside flow control housing 36, entering three-way valve 38 connects in fluid flow communication with loop supply pipe 32, exiting three-way valve 40, and flow setting valve 42; exiting three-way valve 40 connects in fluid flow communication with loop return pipe 34, entering three-way valve 38, and check valve 44; flow setting valve 42 connects in fluid flow communication with entering three-way valve 38 and load supply pipe 46; and check valve 44 connects in fluid flow communication with exiting three-way valve 40 and load return pipe 48.

Figure 5A:
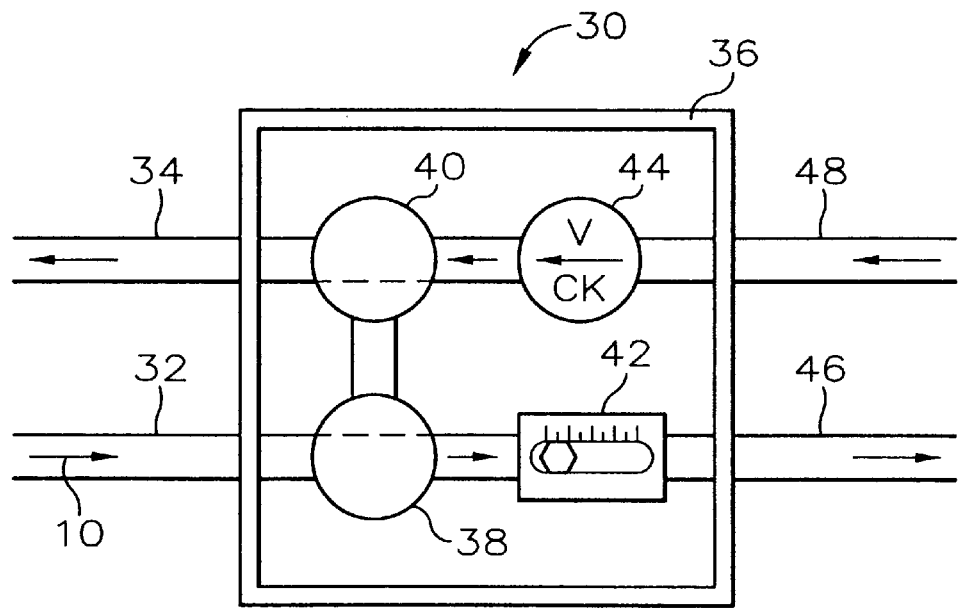
FIGS. 5a–5d are plain views of the flow control center operating in different modes.

FIG. 5a illustrates the typical configuration of flow control center 30 while individual thermal load 50, not shown in FIG. 5a, is in service. After being heat exchanged with the ground in the subterranean heat exchanger(s), circulating heat exchange fluid 10 flows through loop supply pipe 32 and into entering three-way valve 38. Entering three-way valve 38 is positioned so that circulating heat exchange fluid 10 enters only flow setting valve 42. Flow setting valve 42 may be set to allow the desired flow rate of circulating heat exchange fluid 10 to enter individual thermal load 50 through load supply pipe 46. Inside individual thermal load 50, heat is exchanged between circulating heat exchange fluid 10 and the heating or cooling load system. A circulating pump, also located inside individual thermal load 50, then forces circulating heat exchange fluid 10 out of individual thermal load 50, through load return pipe 48, and into check valve 44. Check valve 44 allows circulating heat exchange fluid 10 to flow into exiting three-way valve 40 which is positioned so that circulating heat exchange fluid 10 enters only loop return pipe 34. From loop return pipe 34, circulating heat exchange fluid 10 is then returned to the subterranean heat exchanger(s) for heat exchange with the ground.

Figure 5B:
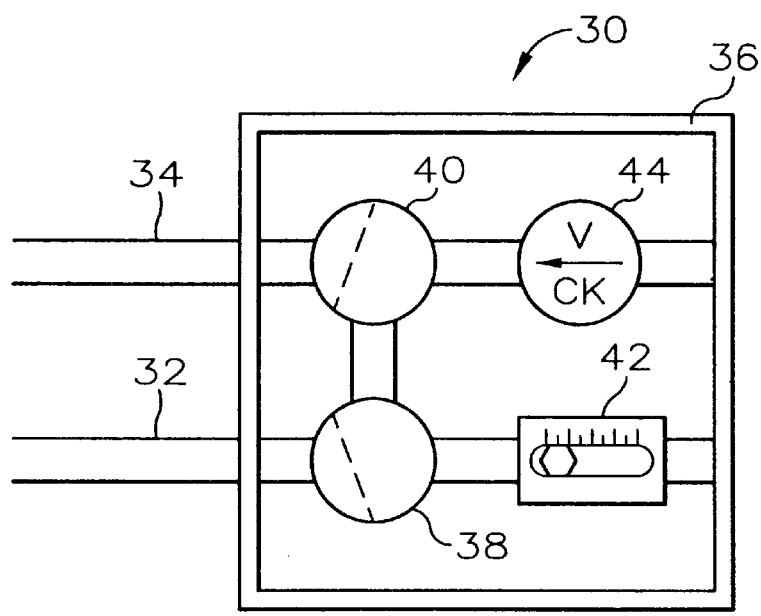

FIG. 5b illustrates the typical configuration of flow control center 30 before installation of a new individual thermal load. The geothermal community loop field of the present invention may be initially installed with many unused flow control centers, such as the one shown in FIG. 5b. These unused flow control centers are typically located in areas where future expansion is planned or predicted. New individual thermal loads may be added to the existing system by simply installing load return pipe 48 and load supply pipe 46 as illustrated in FIG. 5a. In FIG. 5b, both entering three-way valve 38 and exiting three-way valve 40 block any flow in or out of flow control center 30 from either loop supply pipe 32 or loop return pipe 34. This arrangement allows for new individual thermal loads to be installed without affecting the operation of the geothermal community loop field or other individual thermal loads.

Figure 5C:
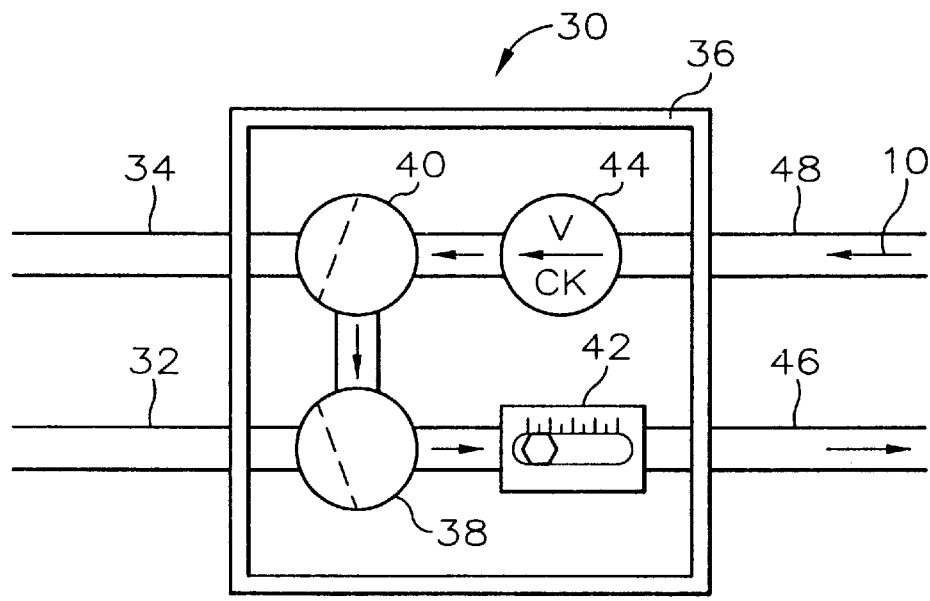

FIG. 5c illustrates the typical configuration of flow control center 30 while circulating heat exchange fluid 10 is being introduced into or extracted from individual thermal load 50, not shown in FIG. 5c. When a new individual thermal load is added to an operating geothermal community loop field, circulating heat exchange fluid 10 is introduced into the newly connected portion of the system through the circulating pump inside individual thermal load 50. When an individual thermal load is shut down for maintenance or repairs, circulating heat exchange fluid 10 may be extracted from individual thermal load 50 by using the circulating pump inside individual load 50 unit to pump out substantially all circulating heat exchange fluid 10.

As shown in FIG. 5c, entering three-way valve 38 and exiting three-way valve 40 block all flow through loop supply pipe 32 or loop return pipe 34, while circulating heat exchange fluid 10 travels from the circulating pump inside individual thermal load 50, through load return pipe 48, and into check valve 44. Circulating heat exchange fluid 10 may then flow from check valve 44 to exiting three-way valve 40 which is positioned so that circulating heat exchange fluid 10 flows only to entering three-way valve 38. Entering three-way valve 38 is positioned so that circulating heat exchange fluid 10 flows only to flow setting valve 42. From flow setting valve 42, circulating heat exchange fluid 10 flows through load supply pipe 46 and back into individual thermal load 50 where it is either recirculated or drained, depending on whether circulating heat exchange fluid 10 is being introduced into or extracted from individual thermal load 50. After the new individual thermal load 50 has been filled with circulating heat exchange fluid 10 or the existing individual thermal load 50 has been refilled with circulating heat exchange fluid 10, entering three-way valve 38 and exiting three-way valve 40 may be adjusted to the configuration shown in FIG. 5a for normal operation.

Figure 5D:
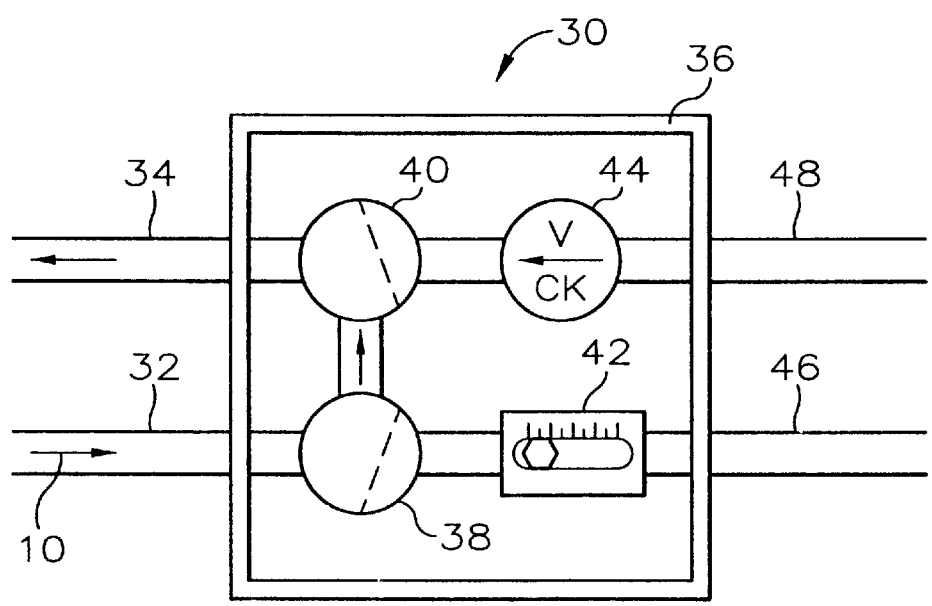

FIG. 5d illustrates the typical configuration of flow control center 30 while circulating heat exchange fluid 10 is being introduced into or extracted from the geothermal community loop field. While exiting three-way valve 40 and entering three-way valve 38 are positioned so that no circulating heat exchange fluid 10 may flow through flow control center 30 from or to individual thermal load 50, circulating heat exchange fluid 10 flows from loop supply pipe 32 into entering three-way valve 38. Entering three-way valve 38 is positioned so that circulating heat exchange fluid 10 flows only to exiting three-way valve 40. Exiting three-way valve 40 is positioned so that circulating heat exchange fluid 10 flows only to loop return pipe 34. After the geothermal community loop field has been filled or refilled with circulating heat exchange fluid 10, entering three-way valve 38 and exiting three-way valve 40 may be adjusted to the configuration shown in FIG. 5a for normal operation.

The flow control centers of the present invention allow for heat exchange fluid to be introduced into or extracted from either the geothermal community loop field or the individual thermal loads without affecting the operation of the other. This permits the owner/operator of the geothermal community loop system to more efficiently expand and maintain the system.

The flow setting valve of the above described flow control centers allows for the flow of heat exchange fluid to each individual thermal load to be set at a constant flow rate and for this constant rate to be adjusted if thermal/and demand changes. This provides a third-party owner of the geothermal community loop field with a means for measuring the usage of each individual thermal load, and thus allows the third party owner to recover installation costs through regular usage fees.

The check valves of the above described flow control centers serve as safety devices for preventing the back-flow of heat exchange fluid into individual thermal loads. The check valve may be necessary in instances when the three-way valves are not properly positioned or under circumstances where the flow of heat exchange fluid through the geothermal community loop field or individual thermal load is abnormal.

The components used in this invention, such as flow control valves 42, check valves 44, three-way valves 40, and pipes 6, 8, 32, 34, 46 and 48 are each commercially available components, which are fully described in Perry's Chemical Engineers Handbook, Sixth Edition, McGraw Hill. Pipes 6, 8, 32, 34, 46 and 48 are preferably polyethylene pipes available from Driscopipe, Inc., Richardson, Tex.

Obviously, many modifications and variations of the present invention are possible in light of the above teachings. It is, therefore, to be understood that within the scope of the appended claims, the invention may be practiced otherwise than as specifically described.

That which is claimed is:

1. A geothermal community loop field serving as a shared means of heat exchange for a plurality of thermal loads, which comprises:

(a) at least one subterranean heat exchanger contacting the ground below the frost line and carrying a circulating heat exchange fluid, said subterranean heat exchanger being adapted for exchanging thermal energy between said ground and said circulating heat exchange fluid;

(b) a plurality of flow control centers connecting said geothermal community loop field in fluid flow communication with said plurality of thermal loads, each one of said flow control center being adapted for controlling the flow of said circulating heat exchange fluid between said geothermal community loop field and one of said plurality of thermal loads; and (c) a purging manhole connected in fluid flow communication with said community loop field, said purging manhole providing a means for introducing said circulating heat exchange fluid into said geothermal community loop field and extracting said circulating heat exchange fluid from said geothermal community loop field.

2. A geothermal community loop field in accordance with claim 1 wherein said flow control centers comprise means for controlling the flow rate of said circulating heat exchange fluid between said geothermal community loop field and said thermal loads.

3. A geothermal community loop field in accordance with claim 1 additionally comprising:

a plurality of loop supply conduits and a plurality of loop return conduits for connecting a plurality of said subterranean heat exchangers in fluid flow communication with said flow control centers; and a plurality of load supply conduits and a plurality of load return conduits for connecting a plurality of said flow control centers in fluid flow communication with said plurality of thermal loads such that each flow control center is connected to a thermal load by a load supply conduit and a load return conduit.

4. A geothermal community loop field in accordance with claim 3 wherein each said flow control center comprises an entering three-way valve, and an exiting three-way valve, a flow setting valve, and a check valve.

5. A geothermal community loop field in accordance with claim 4 wherein:

said entering three-way valve of said flow control center is connected in fluid flow communication with said exiting three-way valve, said flow setting valve, and a loop supply conduit which carries said circulating heat exchange fluid away from said subterranean heat exchanger into said flow control center;

said exiting three-way valve of said flow control center is connected in fluid flow communication with said entering three-way valve, said check valve, and a loop return conduit which carries said circulating heat exchange fluid out of said flow control center towards said subterranean heat exchanger;

said flow setting valve of said flow control center is connected in fluid flow communication with said entering three-way valve and a load supply conduit which carries said circulating heat exchange fluid out of said flow control center and into said thermal load; and said check valve of said flow control center is connected in fluid flow communication with said exiting three-way valve and a load return conduit which carries said circulating heat exchange fluid out of said thermal load and into said flow control center.

6. A geothermal community loop field in accordance with claim 1 wherein a plurality of subterranean heat exchangers are employed and said series of conduits is connected in fluid flow communication with said subterranean heat exchangers in an arrangement which allows said circulating heat exchange fluid to flow through said subterranean heat exchangers in a parallel manner.

7. A geothermal community loop field serving as a shared means of heat exchange for a plurality of thermal loads, which comprises:

(a) a plurality of subterranean heat exchangers contacting the ground and carrying a circulating heat exchange fluid, said subterranean heat exchangers being capable of facilitating the exchange of thermal energy between said ground and said circulating heat exchange fluid;

(b) a plurality of flow control centers connecting said geothermal community loop field in fluid flow communication with said thermal loads, each of said flow control centers being capable of controlling the flow of said circulating heat exchange fluid between said geothermal community loop field and a single thermal load, each comprising:

(i) an entering three-way valve connected in fluid flow communication with an exiting three-way valve, a flow setting valve, and a loop supply conduit which carries said circulating heat exchange fluid away from said subterranean heat exchangers into said flow control center;

(ii) an exiting three-way valve connected in fluid flow communication with said entering three-way valve, a check valve, and a loop return conduit which carries said circulating heat exchange fluid out of said flow control center towards said subterranean heat exchangers;

(iii) a flow setting valve connected in fluid flow communication with said entering three-way valve and a load supply conduit which carries said circulating heat exchange fluid out of said flow control center and into said thermal load; and (iv) a check valve connected in fluid flow communication with said exiting three-way valve, and a load return conduit which carries said circulating heat exchange fluid out of said thermal load and into said flow control center;

(c) a conduit system which connects said subterranean heat exchanger, said loop supply conduits and said loop return conduits in fluid flow communication, said conduit system connecting with said subterranean heat exchangers in an arrangement which allows said circulating heat exchange fluid to flow through said subterranean heat exchangers in a parallel manner when a plurality of subterranean heat exchangers are employed; and (d) a purging manhole connected in fluid flow communication with said piping means, said purging manhole providing a means for introducing said circulating heat exchange fluid into said geothermal community loop field and extracting said circulating heat exchange fluid from said geothermal community loop field.

* * * * *